Figure 1:
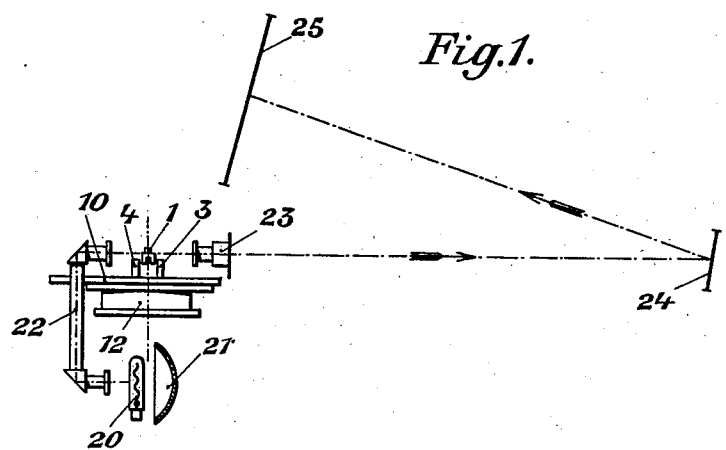

Jan. 13, 1931.   H. LUCE   1,789,009
METHOD AND MEANS FOR SETTING TYPE BODIES
Filed Jan. 3, 1929   3 Sheets-Sheet 1

INVENTOR
HANS LUCE
BY
ATTORNEYS

Jan. 13, 1931.　　　　H. LUCE　　　　1,789,009
METHOD AND MEANS FOR SETTING TYPE BODIES
Filed Jan. 3, 1929　　3 Sheets-Sheet 2
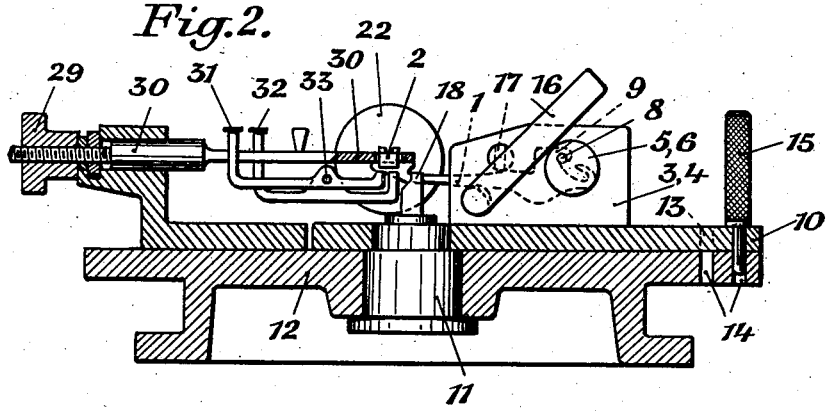
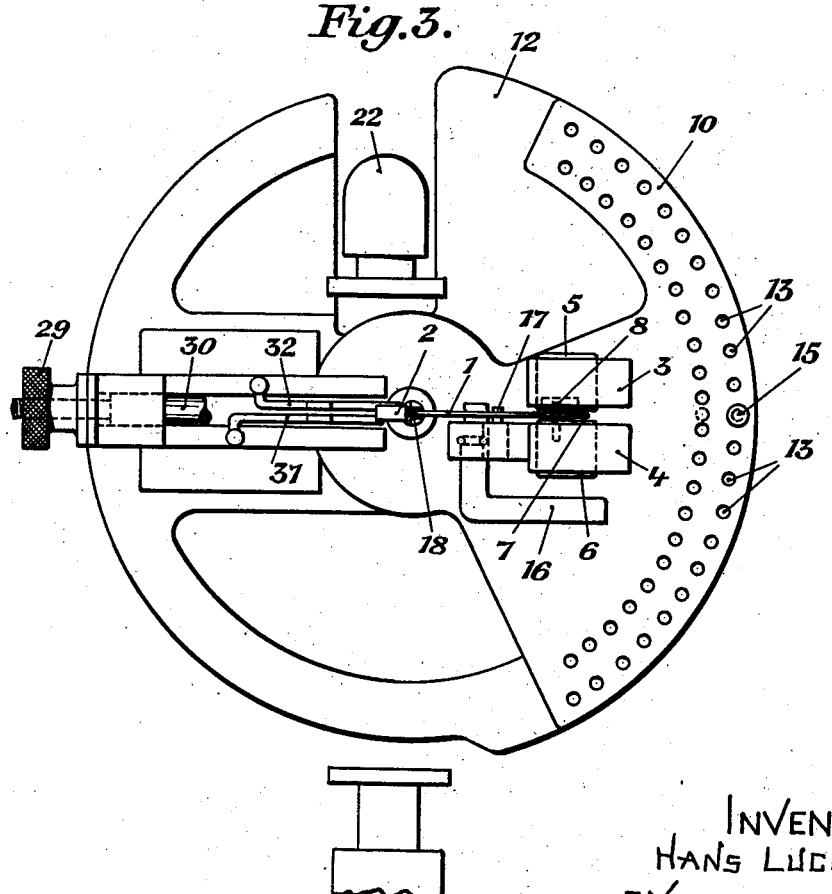
INVENTOR:
HANS LUCE
BY
ATTORNEYS Jan. 13, 1931.  H. LUCE  1,789,009
METHOD AND MEANS FOR SETTING TYPE BODIES
Filed Jan. 3, 1929   3 Sheets-Sheet 3
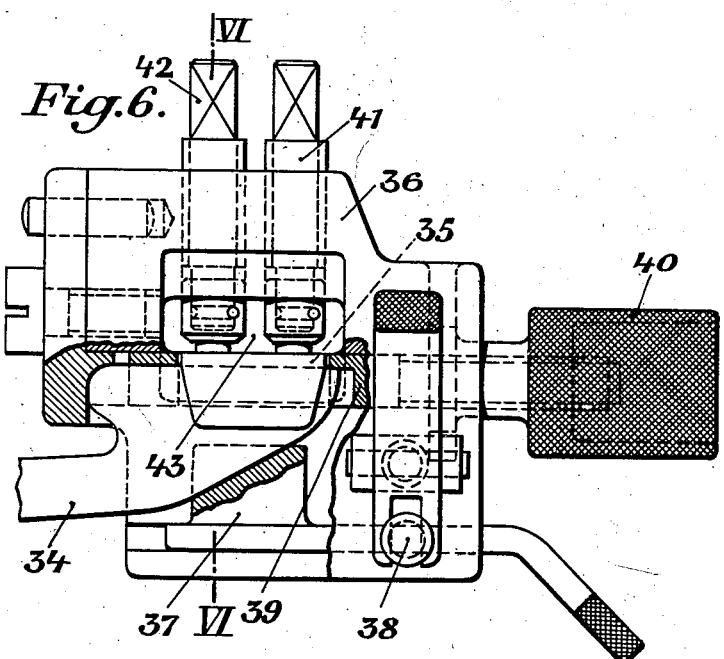
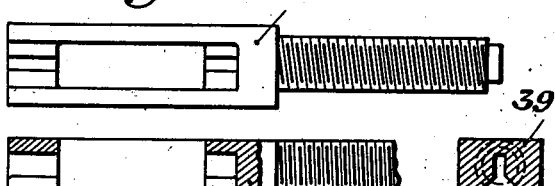
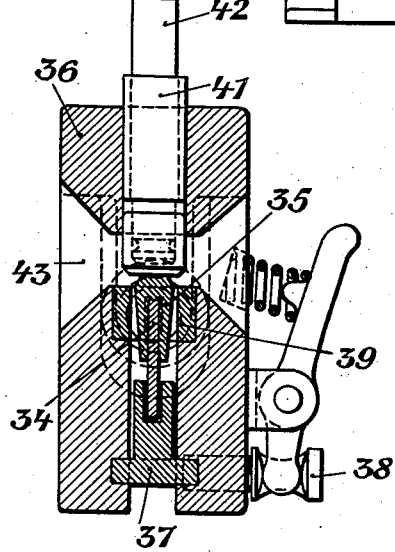
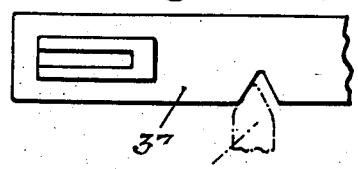
INVENTOR:
HANS LUCE
BY
ATTORNEY.

Patented Jan. 13, 1931

1,789,009

UNITED STATES PATENT OFFICE

HANS LUCE, OF DUSSELDORF, GERMANY, ASSIGNOR TO RHEINISCHE METALLWAAREN-UND MASCHINENFABRIK SÖMMERDA-AKTIENGESELLSCHAFT, OF SOMMERDA, GERMANY, A CORPORATION OF GERMANY

METHOD AND MEANS FOR SETTING TYPE BODIES

Application filed January 3, 1929, Serial No. 330,052, and in Germany February 3, 1928.

To obtain the necessary degree of exactness in the position of the types upon the type-levers of type writing machines, the types are, according to the present invention, arranged upon the head of the type-levers in a nearly correct position by frictionally pushing their back slots upon corresponding projections of said head.

The so prepared type-levers are then fixed in a suitable device in a definite position. A profile-likeness or image of the type body arranged upon the head of the type-lever is projected upon an image surface by means of a source of light arranged at the side of the type body and connected to the base frame of the device for fixing or clamping the type-lever. The image surface upon which the enlarged image of the type body is thrown is also rigidly connected to the frame of the clamping device for the type-lever. Deviations of the type body from the correct position upon the head of the type-lever are evidently also shown as deviations of the outlines or contours of the image of the type body from marks provided upon the image surface and indicating or representing the platen of the type writing machine. According to the invention the position of the image of the type with regard to the circles and marks, representing the contour of the platens and the correct position of the type in a tangential direction, is then examined, whereupon deviations are corrected or removed by vertically and longitudinally shifting the type body relatively to the head of the type-lever. The result of this operation is observed and finally the conformity between the position of the marks and the edges of the image of the type is ascertained. Hereby the problem of the invention is solved, viz, that, after carrying out the method, a complete type-lever results outside and independent of the type writing machine, which type-lever carries and frictionally holds the type body in the required and absolutely exact position. After soldering, the type body can no longer change or alter its position, so that a type-lever made in this manner fits any type writing machine of a corresponding model, and may therefore be exchanged and assures a uniform writing with adjusted characters after mounting in the type writing machine together with the other type-levers made and treated in the same manner. In order to positively obtain this end it is, of course, necessary that the manufacture of the type bodies and type-levers themselves be exactly uniform and that the type writing machines in connection with which these type-levers are to be used also are of sufficient exactness and equality, which is possible by the methods of manufacturing used to-day.

The clamping and guiding members of the clamping device seize or hold the lever at the same points at which contact and guidance occurs between the lever and the members of the type writing machine in the moment the type comes into contact with the paper platen of the machine. The clamping members bring each of the successively clamped type-levers in the same position with regard to the whole device and to each other. The other means used serve to give the type body upon the head of the type-lever the correct working position (printing position) and to give all type-levers of the same kind and all type-levers having other characters (for the same model of machine) the same position. When arranged upon a turn-table the clamping device may, together with the fixed type-lever (or before the type-lever is fixed in position) be oscillated about a pivot pin having a centre point corresponding to that of the type-lever segment of the type writing machine. The slot formed between the guide jaws upon the turn-table and serving for the reception of the type-lever may, by an oscillation of the turn-table about its centre point, be brought and fixed into different positions each of which corresponds to the definite position of one of the bearing slots provided in the segment of the type writing machine. By the use of this device the head of the type-lever, carrying the type body with types, always remains uniformly directed in the device. This is true for the straight centre type-lever as well as for all other type-levers arranged in the type writing machine at both sides of said centre type-lever, the longer portion of such levers being bent at an angle with regard to the head carrying the type body.

Instead of connecting the adjusting device for bringing the type body into the correct position upon the head of the type-lever to the frame of the clamping device, that is to say, instead of using an adjusting device separated from the head of the type-lever, the head of the type-lever and a frame may, by clamping the one upon the other, be connected so to say to a unit; in which case the said frame contains the means for vertically and longitudinally shifting the type body upon the head of the type-lever.

When the type-lever is fixed in the whole device, the frame rigidly connected to this type-lever also will be fixed. The adjusting means act upon the type body and upon the type-lever independently of the means for fixing the type-lever, and this device could also be employed, if the type-lever were not at all fixed in a particular clamping device.

The deviations of the position of the types from the required correct working position are, by means of the image projecting device, made so evident, that even the smallest differences of the positions may be seen and corrected. This adjustment of the type body upon the type-lever in a vertical and horizontal direction may be done by hand or by the use of mechanical means or also partly manually and partly mechanically.

In the accompanying drawings two constructions of devices for carrying out the method according to the present invention are shown by way of example.

Figure 4:
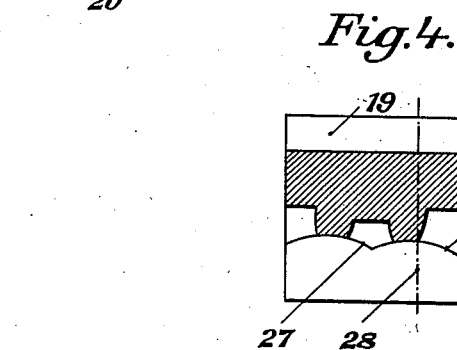
Figure 5:
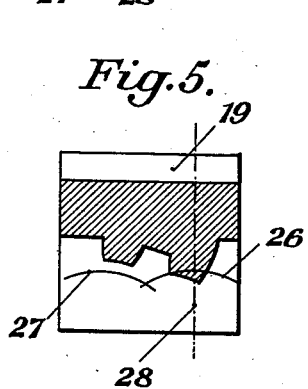

Figure 1 is a diagrammatic general view of a device for carrying out the new method; Figures 2 and 3 are a cross section and a plan view of the means used in the device according to Figure 1 for fixing the type-levers and for correcting the position of the type bodies frictionally connected to the said fixed type-levers; Figures 4 and 5 show a portion of the image surface of the projecting apparatus with the marks provided upon the same for indicating the position of the platen, these figures also showing the type image appearing upon said surface respectively after and before the position of the type body upon the type-lever has been corrected; Figure 6 is a part sectional side elevation of a modified construction of a device for carrying out the methods according to the invention; Figure 7 shows a cross section on line VI—VI of Figure 6 and Figures 8—11 are detail views.

The type-lever 1 with the type body 2 pushed upon its head is arranged in a slot 7 formed by the two guide pieces 5 and 6 arranged in the bearing members 3 and 4. A pin 8 extends through the slot 7 and the position and the diameter of this pin 8 correspond to the position and the diameter of the bearing wire of the segment for the type-levers.

A hook 9 of the type-lever 1 engages the pin 8. The slot 7, only one of which is provided in the device, replaces all the bearing slots provided in the segment for the type-levers of the type writing machine. The width of the guide slots 7 is equal to the width of the slots provided in the segment of the type writing machine. The members forming the slot 7 may, together with the turn-table 10, be oscillated about the pivot 11 into any angular position and fixed upon the base plate 12. For this purpose there are provided holes 13 at the periphery of the turn-table 10, counter holes 14 in the base plate 12 and a locking bolt 15. The number of the holes 13 corresponds to the number of the differently bent type-levers of the type writing machine. Each of the holes 13 determines the position of the turn-table 10 for a particular kind of type-lever, the longer hind portion of each lever having a definite angular relation with respect to the head portion.

An eccentric lever 16 serves for pulling the type-lever 1 around the pin 8 as pivot upwardly against a projection or stop 17 which is provided at one of the bearing bodies for the guide members. When the type-lever 1 abuts against the stop 17 it assumes the same position which it would occupy in the type writing machine at the moment the type contacts with the platen of the machine. In this position the type-lever 1 is fixed by the eccentric lever 16. The type-lever 1 is, moreover, guided in the slot of the small bearing block 18 closely behind its head and the type body. The type-lever 1, therefore, cannot shift laterally during the operation of correcting the position of the type body.

In the clamping device the stop 17 bodily replaces the platen of the type writing machine which ought to be situated above the head of the type-lever 1, but is not present at this point and is, moreover, replaced by the pattern-like marks 26 and 27 of the outlines of the platen which marks are provided on an enlarged scale upon the image surface 19 (Figures 1, 4 and 5) and will be described hereinafter.

The image projecting device for producing the image upon the image surface 19 is rigidly connected to the frame of the clamping device described above and consists of a source of light 20 with a reflector 21 and the optical transmitting apparatus 22 by means of which the light rays are thrown upon the head of the type-lever in a lateral and vertical direction to the plane of the type-lever head. These light rays throw the shadow-image of the head of the type-lever through the enlarging objective 23 and by way of the mirror 24 upon the opaque glass 25. The marks 26 and 27 upon this glass represent the correct position of the outline of the platen with regard to two characters (capital and small letters). The line mark 28 indicates the base for the lines against which the lower contour of the type for small letters must bear if the type body occupies the correct position upon the head of the type-lever. The profile-image of the type body is shown in the correct position in Figure 4, whereas Figure 5 shows the image of the type body arranged upon the head of the type-lever in an incorrect position which the type body may assume before the type-lever is fixed into the clamping device or which it occupies as an intermediate position during the correcting operation.

In the construction shown by way of example in Figures 1 and 3 the members of the clamping device are so arranged with regard to those of the image projecting device, that the person, operating the whole device, always has the image surface with its marks and the appearing shadow-image of the type body a short distance in front of the eyes, and is not hindered in doing the work of adjusting and fixing the type-levers in the clamping device as well as of taking them out again and of performing the operations necessary for making the corrections, because by means of the mirror 24, arranged in the path of the light rays coming from the projecting apparatus, the rays are deflected at an angle and the image is thrown back upon the inclined image surface arranged close to the clamping device.

In this embodiment it has been assumed, that the displacement of the type-lever in the longitudinal direction, which may be necessary to obtain the correct position of the type body, is carried out mechanically by means of a micrometer screw 29 often used for the purpose of making adjustments. The micrometer screw 29 shifts a slide 30 the front end of which has a rectangular recess, so that it may surround all sides of the type-lever 1. To move the type body upwardly with respect to the type-lever, two levers 31 and 32 are provided which are pivoted upon a common pin 33. One of these levers 31, 32 acts upon one end of the type body, for instance the end at which the capital letter is arranged, whereas the other of the levers 31, 32 acts upon the other end of the type body, for instance the end at which the small letter is arranged. The type body may be lowered with regard to the type-lever by carefully knocking upon the type body by means of a small wooden hammer or by the aid of mechanical auxiliary devices.

In the construction shown in Figures 6–11 and representing a modified device for carrying out the method according to the invention, the type-lever 34 is fixed in the manner described above with respect to the type-lever 1 and the type body 35 is pushed with its rearward slot upon the head of the type-lever 34. A frame 36 is fixed upon the head of the type-lever 34. This is effected by means of a wedge member 37 which has a running fit in guides provided in the frame and is pressed (to the left) against the lower narrow side of the head of the type-lever which at the upper and side parts bears against counter surfaces of the frame. A locking and safety device 38 acts to permanently maintain the desired position between the head of the type-lever and the adjusting frame 36. A slide 39 is movably arranged in the frame 36 and may be adjusted in the longitudinal direction of the type-lever by means of a micrometer screw 40. The slide 39 has a rectangular recess or other corresponding projections, so that it may surround the type body. Screws 41 and 42 are movable up and down in the frame 36 in a direction vertical to the upper surface of the type body and the head of the type-lever. On screwing down these screws one of them bears with its end upon the type for writing a capital letter and the other with its end against the type for writing a small letter. The beam of light, coming from the image projecting device described above, passes through the free opening 43 in the frame 36.

In this device the type body is first arranged upon the type-lever in such a manner, that it is situated a little too high with respect to the head of the type-lever, whereupon it is brought into the correct position of height by screwing down the screws 41 and 42. By means of the micrometer screw 40 the slide 39 is moved to bring the type body into the correct longitudinal position. The adjustments may be controlled by the optical device also described above.

What I claim is:

1. A method of examining and obtaining the correct position of type bodies upon type-levers of type writing machines, which comprises frictionally clamping a type body upon a type-lever in nearly correct position, fixing said type-lever with said type body in a clamping device in a position corresponding to that which said type-lever would occupy in a type writing machine at the moment of contact with the platen, throwing a profile-image of said type body upon an image surface and exactly adjusting said type body according to a mark which is provided upon the said image surface and indicates the position of the outline of the platen and the correct position of the said type body in the longitudinal direction of said type-lever.

2. In an apparatus of the kind described, in combination, a clamping device for fixing a type-lever in a position corresponding to that which it would occupy in a typewriting machine at the moment of contact with the platen, said device comprising a base plate having clamping members thereon; an image surface having a mark thereon indicating the outline of the platen and the correct longitudinal position of a type body with respect thereto; and an image projecting device connected to said base plate in such manner that its light rays fall laterally upon the lateral surface of the type-body mounted upon said type-lever.

3. The combination as set forth in claim 2, including fixing members arranged upon said base plate for fixing each type lever of a set of levers having different angles between their heads and the portions carrying such heads, in a position which is always the same for the said heads and corresponds to that which the heads would occupy at the moment of contact with the paper platen when assembled in a typewriting machine.

4. The combination as set forth in claim 2, including a clamping table capable of being oscillated upon the said base plate and directly supporting said clamping members, the distance between the axis of rotation of said clamping table and the pivot point of a type lever clamped by said device being equal to the distance between the center point of the segment for the type levers and the same point of the said type lever mounted in the typewriting machine.

5. The combination as set forth in claim 2, including a clamping table capable of being oscillated upon the said base plate and directly supporting said clamping members, the distance between the axis of rotation of said clamping table and the pivot point of a type lever clamped by said device being equal to the distance between the center point of the segment for the type-levers and the same point of the said type lever mounted in the typewriting machine, said clamping table being provided with adjusting means co-operable with said base plate to fix said table in predetermined angular positions, whereby the position of the heads of all the differently bent type-levers, when the latter are fixed in the clamping device, remains the same.

6. The combination as set forth in claim 2, including a mirror arranged in the path of the light beam coming from said projecting device to throw an enlarged profile image of a type-body upon said image surface, said image surface being positioned near said clamping device and between said mirror and the front of the apparatus where the operator is positioned.

7. The combination as set forth in claim 2, including a slide arranged upon said base plate of said clamping device in line with said type-lever, means at the free end of said slide for surrounding said type body and a micrometer screw for moving said slide to and fro for the purpose of longitudinally adjusting said type body.

8. The combination as set forth in claim 2, including adjusting levers pivotally arranged at the said base plate of said clamping device and keys for operating said adjusting levers, said adjusting levers acting upon the lower face of said type body clamped upon said head of said type-lever for shifting said type body upwardly to adjust its position vertically upon the head of the type-lever.

9. The combination as set forth in claim 2, including an adjusting frame clamped to the head of the type-lever to form a unit and screws movable up and down in said frame and acting upon said type body to adjust its position vertically upon the head of the type-lever.

10. The combination as set forth in claim 2, including an adjusting frame clamped to the head of the type-lever to form a unit and screws movable up and down in said frame and acting upon said type body to adjust its position vertically upon the head of the type-lever, and means contained in said frame for adjusting said type body in the longitudinal direction of said type-lever.

11. A method of positioning a type body upon a type lever of a typewriting machine, which comprises mounting the type body upon the type lever, projecting an image of the type body upon a gaged image surface, and then adjusting the type body upon the lever until the projected image bears a predetermined relation to the gage marks on the image surface.

12. A method of positioning a type body upon a type lever of a typewriting machine, which comprises mounting the type body upon the type lever, fixing said lever in the position it would occupy in a typewriting machine at the moment of contact with the platen, projecting an image of the type body upon a gaged image surface, and then adjusting the type body upon the lever until the projected image bears a predetermined relation to the gage marks on the image surface.

13. In an apparatus of the class described, in combination, a support for holding a type-lever in fixed position, an image surface having gage marks thereon indicating the correct position of a type-body on a type-lever, and a projecting device for casting upon said surface an image of a type-body positioned on a type-lever on said support.

14. In an apparatus of the class described, in combination, a support for holding a type-lever in fixed position, an image surface having gage marks thereon indicating the correct position of a type-body on a type-lever, a projecting device for casting upon said surface an image of a type-body positioned on a type-lever on said support, and means on said support for adjusting said type body on said lever.

In testimony whereof I have affixed my signature.

HANS LUCE.